United States Patent [19]
Conran et al.

[11] Patent Number: 6,035,771
[45] Date of Patent: Mar. 14, 2000

[54] KITCHEN EQUIPMENT

[75] Inventors: Sebastian Conran; Joseph Patrick O'Connor, both of London, United Kingdom

[73] Assignee: William Levene Limited, Harrow, United Kingdom

[21] Appl. No.: 09/269,772

[22] PCT Filed: Aug. 1, 1997

[86] PCT No.: PCT/GB97/02064

§ 371 Date: Jun. 17, 1999

§ 102(e) Date: Jun. 17, 1999

[87] PCT Pub. No.: WO99/05946

PCT Pub. Date: Feb. 11, 1999

[30] Foreign Application Priority Data

Jul. 3, 1996 [GB] United Kingdom ................... 9613932

[51] Int. Cl.[7] .............................. A23N 1/02; B02C 25/00; B02C 18/18; A47J 43/06
[52] U.S. Cl. ................................. 99/510; 99/348; 99/495; 241/92; 241/199.12; 241/282.1
[58] Field of Search ............................. 99/348, 492, 495, 99/509–513, 623–631; 241/92, 93, 37.5, 68, 282.1, 282.2, 199.12, 101.2, 285.1, 280, 166; 83/355, 356.3, 592, 326, 423, 932, 435.2; 366/197, 307, 314, 244–254, 341

[56] References Cited

U.S. PATENT DOCUMENTS

| | | |
|---|---|---|
| 2,658,642 | 11/1953 | Casella . |
| 4,198,887 | 4/1980 | Williams, Jr. .................. 83/592 X |
| 4,227,655 | 10/1980 | Williams ............................ 241/92 |
| 4,277,995 | 7/1981 | Sontheimer ..................... 83/592 X |
| 4,283,979 | 8/1981 | Roakocy ......................... 241/92 X |
| 4,331,300 | 5/1982 | Hicks et al. ..................... 241/282.1 |
| 4,369,680 | 1/1983 | Williams ......................... 99/510 X |
| 4,393,737 | 7/1983 | Shibata ......................... 241/282.2 X |
| 4,448,100 | 5/1984 | Breeden ......................... 241/92 X |
| 4,700,901 | 10/1987 | McClean ......................... 241/282.1 |
| 4,706,896 | 11/1987 | Moon-Kau ....................... 241/37.5 |
| 4,768,429 | 9/1988 | Federighi ........................ 99/623 X |
| 4,840,119 | 6/1989 | Caldi ............................... 99/513 X |
| 5,435,237 | 7/1995 | Huang ............................. 99/510 |

FOREIGN PATENT DOCUMENTS

| | | |
|---|---|---|
| 830382 | 7/1938 | France . |
| 9205004 | 8/1992 | Germany . |
| 25615 | 6/1913 | United Kingdom . |

*Primary Examiner*—Timothy Simone
*Attorney, Agent, or Firm*—Ratner & Prestia

[57] ABSTRACT

A food processor has a handle (4) connected to a gear assembly (G1, G2, G3, G4) by which different rotary tools (B) connected to the end (10) of a central shaft (8) in the processor may be rotated (FIG. 3). Different sets of the gears are engaged according to the speed with which the selected tool is to be rotated.

11 Claims, 9 Drawing Sheets

KITCHEN EQUIPMENT

This application is the U.S. national phase application of PCT International Application No. PCT/GB97/02064 filed Aug. 1, 1997.

The invention relates to a manual or hand operated food processor which is a domestic tool used to slice, cut, chop or otherwise treat a variety of foodstuffs. A known food processor comprises a container having a releasable lid, a handle on top of the lid and connected by a gear to a tool within the container. Rotation of the handle is arranged to cause rotary movement of the tool.

It is one object of this invention to provide a manually operated food processor which has a particularly efficient mechanical operation and which is versatile.

According to the invention in one aspect there is provided a hand operated food processor comprising a container for the food to be processed; a plurality of rotary tools each for processing food; each tool being individually releasably engaged with engaging means connected to a gear assembly, the engaging means comprising one end of a first shaft carrying a gear which engages a gear wheel connected to a drive shaft for a rotary handle, by which the processor is hand operated; a third shaft carrying two spaced apart gears of different diameters adjacent the other two, the four gears forming the gear assembly, arranged so that in one condition the first gear engages the drive shaft gear and the gears of the third shaft are idle and the tool connected to the engaging means is rotatable at a relatively slow speed and in a second condition the first shaft gear engages the wider diameter gear on the third shaft and the narrower diameter gear engages the drive shaft gear, whereby the tool connected to the engaging means is rotatable at a relatively faster rate.

Preferably the food processor includes a range of tools, e.g. to cut, slice, mix, beat, whisk, and the like. Preferably each tool is individually releasably engaged with engaging means connected to the gear assembly, the tool being arranged to locate the gear assembly in the operating condition appropriate to that tool in use.

Most preferably the processor includes a lid detachably engagable with the bowl, a generally central hole in the lid, the first shaft extending through the hole into the bowl, the shaft being urged downwardly into the bowl by the spring means, the drive shaft being offset from the central shaft, the gears being inter-engagable to co-operate so that hand rotation of the handle rotates the central shaft, the third rotary shaft being mounted on the lid with the two gears being vertically spaced apart, the upper gear being of a greater diameter than the lower.

Preferably the food processor includes a set of tools releasably engagable with the lower end of the shaft and which collectively may be stored in the bowl.

Other features of the invention are set out in the dependent Claims.

In order that the invention may be well understood it will now be described by way of example only with reference to the accompanying diagrammatic drawings in which.

Figure 1:
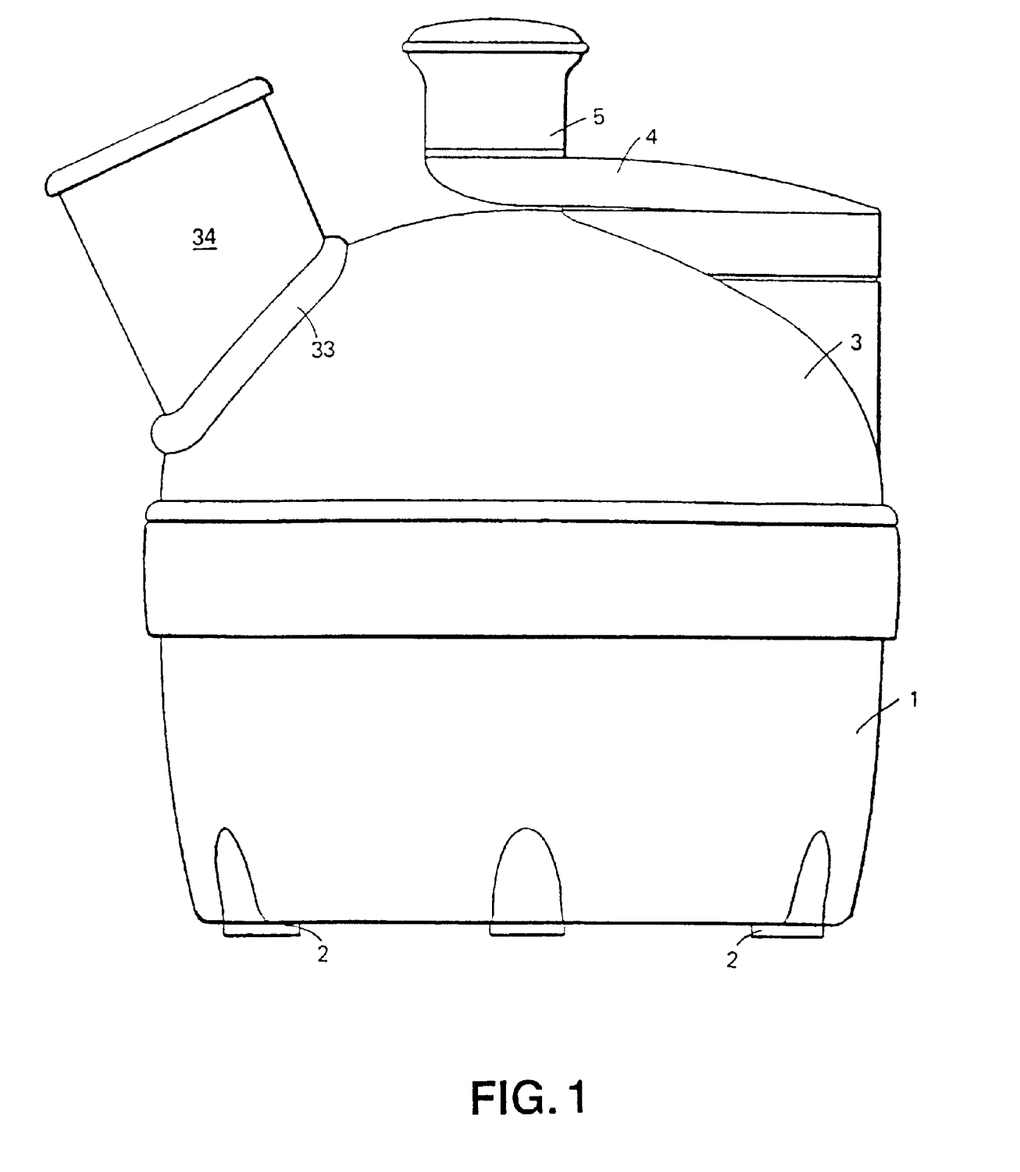
FIG. 1 is a side elevation of one manual food processor of the invention.

The apparatus comprises a bowl 1 standing on anti-slip feet 2 and a dome-shaped lid 3 which fits over and engages the bowl 1. The bowl and lid are made of ABS or like material. A handle 4 is present on the lid and has a handle knob 5. The structure and operation of the handle 4 will be described later.

Figure 2:
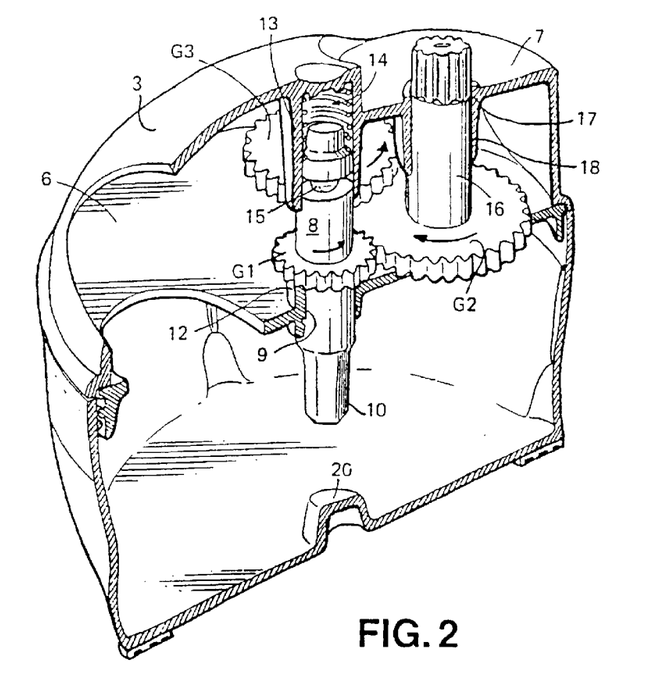
FIG. 2 is a partly cut away perspective view of the food processor of FIG. 1.
Figure 3:
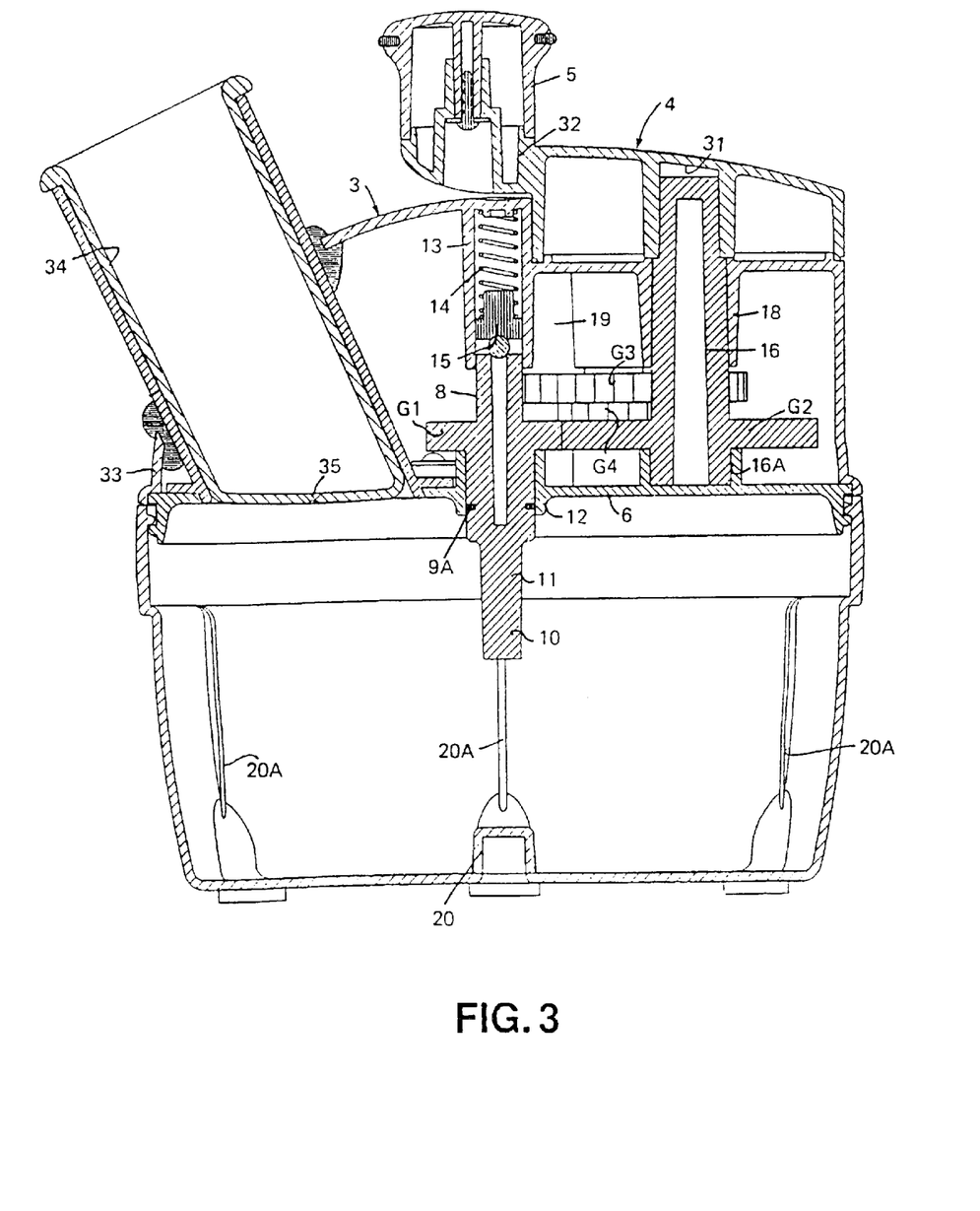
FIG. 3 is a vertical section of the food processor of FIG. 1.

As shown in FIGS. 2 and 3, the lid 3 is made up a floor 6 and a dome-shaped roof 7. A central gear shaft 8 is present in a hole 9 in the centre of the floor. The shaft 8 is a bar having a polygonal lower end portion 10 above which is a round portion length 11, a spur gear wheel G1 being present about the mid point. A wall 12 is present about the hole 9 and extends below the floor 6. A ring seal 9A is present between the shaft round portion 11 and the wall 12. A socket 13 depends from the roof. A compression spring 14 is seated in the socket 13 and ends in a button piston 15 which contacts the upper end of the central gear shaft 8. A drive handle shaft 16 is present to one side of the central gear shaft 8 and sits in a socket 16A standing on the floor and protrudes through a hole 17 in the roof. The upper part of the handle shaft 16 sits in a socket 18. A drive handle gear wheel G2 is present at the lower end of the shaft 16 and contacts the central shaft gear wheel G1. A dual shaft 19 is mounted adjacent the central shaft 8 and the drive handle shaft 16. The dual gear shaft has two vertically spaced apart gear wheels G3, G4, an upper wider gear wheels G3 and a lower and smaller gear wheel G4.

Figures 4, 5:
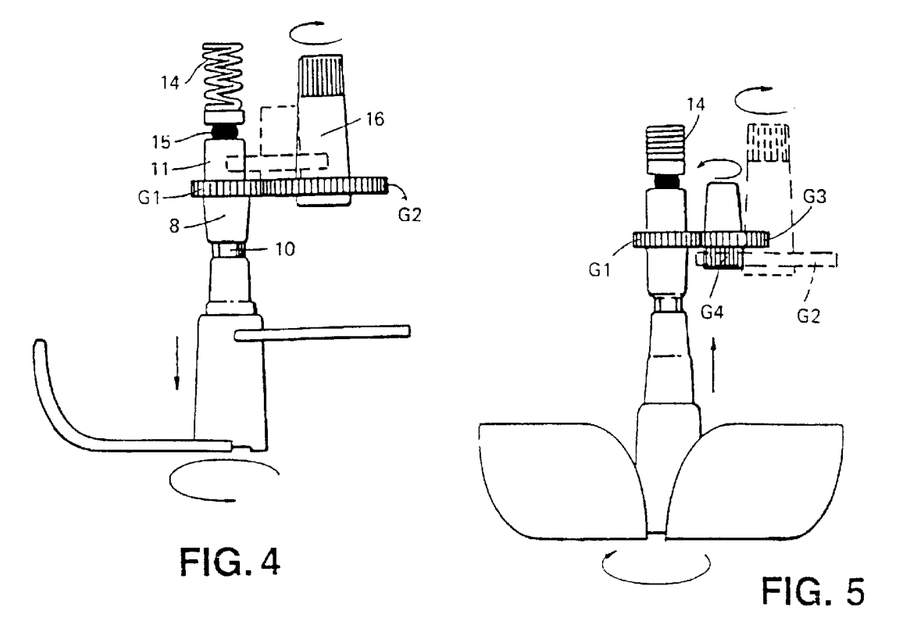
FIG. 4 is an elevation showing the gear train in the low speed condition.
FIG. 5 is an elevation showing the gear train in the high speed condition.
Figure 6:
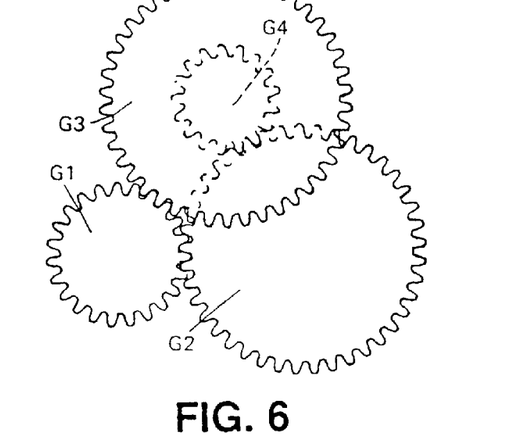
FIG. 6 is an underneath plan view of the gear train.
Figure 7:
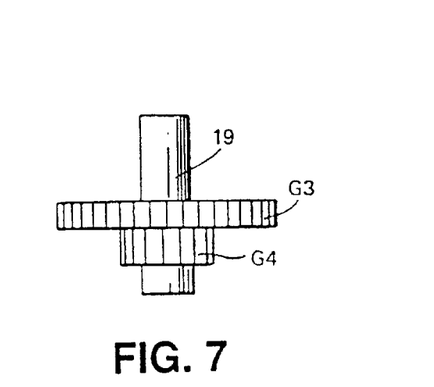
FIG. 7 is an elevation of the third shaft carrying two gear wheels.
Figure 8:
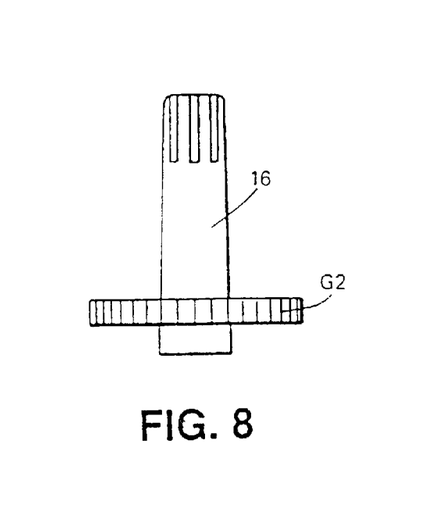
FIG. 8 is a side elevation of the drive shaft for the handle carrying one gear wheel.

The shafts are moulded of aceryl copolymer or the like. The central shaft gear wheel G1 has 23 teeth, the drive handle gear wheel G2 has 41 teeth, the upper gear wheel G3 of the dual gear shaft has 42 teeth and lower G4 has 17. In one condition (shown in FIG. 4) the drive gear wheel G2 is in mesh with the central shaft gear wheel G1 and the other gear wheels are idle, the central shaft 8 being in its lowermost position with the spring 14 expanded; rotation of the drive handle 16 will cause the central shaft 8 to rotate anticlockwise at a relatively low speed. In such a case the ratio is 1:1.8. In the second condition (shown in FIG. 5) the central shaft 8 is urged upwardly compressing the spring 14, the central shaft gear wheel G1 engaging the upper gear wheel G3 of the dual gear shaft 19 and the lower gear wheel G4 of that shaft engaging the drive shaft gear wheel G2. In such a condition rotation of the drive handle 16 causes the central shaft 8 to rotate at relatively high speed in the clockwise direction, and the gear ratio is 1:4.4.

Figure 9A:
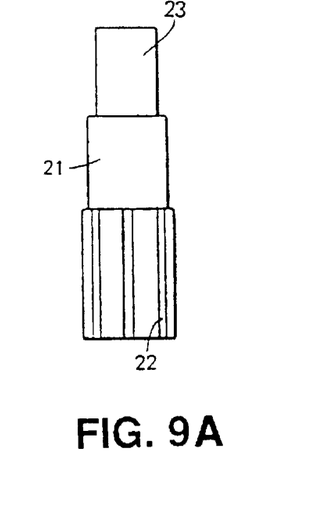
FIGS. 9A, 9B and 9C are respectively elevation, top plan and bottom plan views of a stem for use with high speed tools.
Figure 9B:
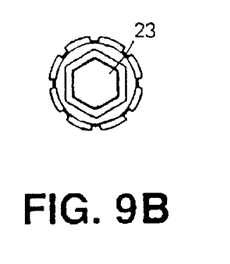
Figure 9C:
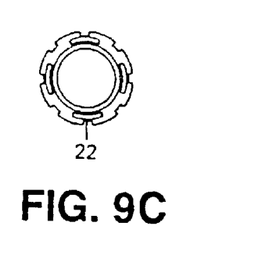

As shown in FIGS. 2, 3 and 9, the generally flat floor of the bowl 1 has an upstanding boss 20 at its centre. Internal ribs 20A are spaced about the wall of the bowl. An elongate hollow stem 21 shown in FIG. 9 has at its lower end a socket 22 shaped to fit over and receive the boss 20. The stem has lengths of decreasing diameter and the uppermost length portion 23 has a polygonal opening shown in FIG. 8B to engage the polygonal end 10 of the central shaft 8.

Figure 10:
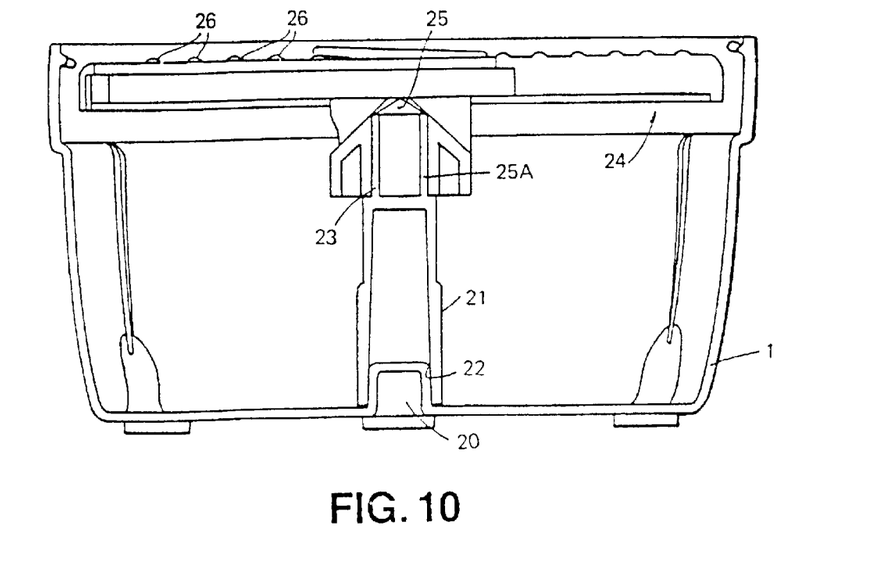
FIG. 10 is a vertical section through the bowl of the processor of FIG. 1 showing the stem and blade carrier.
Figure 11A:
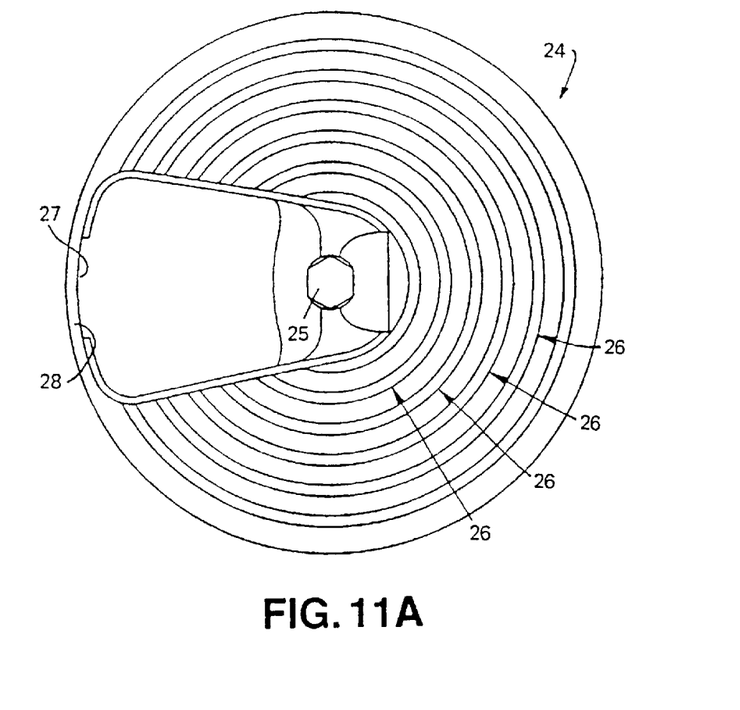
FIG. 11A is a plan view of the blade carrier shown in FIG. 10 and FIG. 11B the underneath plan thereof.
Figure 11B:
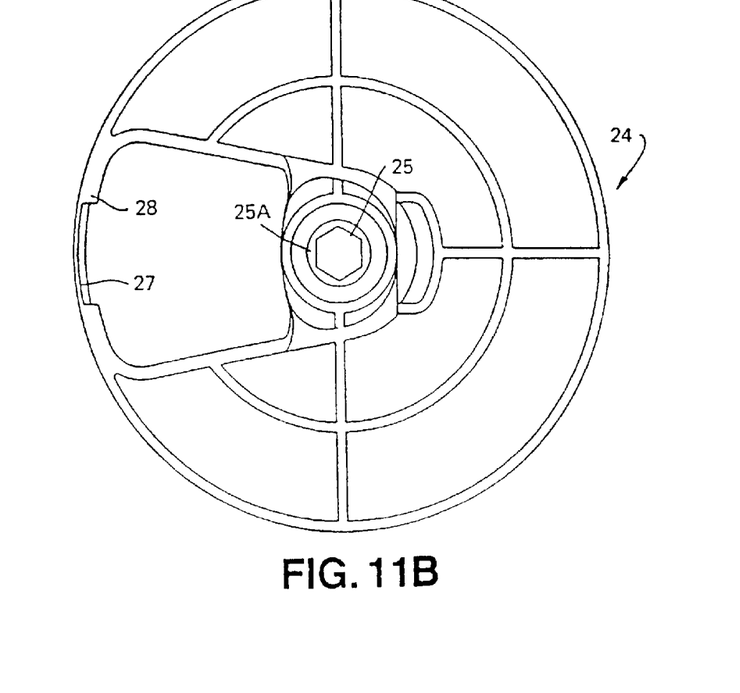

A blade carrier 24 is a generally flat annular body made of say polypropylene and having a hexagon shaped hole 25 at its centre (shown in FIG. 10). A wall 25A is present below the carrier 24 about the hole 25. Annular ribs 26 are present on the top of the blade carrier. An enclosed slot 27 is present in one side of the carrier body and is shaped to receive any one of a number of blade tools B. The wall of the slot 27 is recessed at its outer edge 28 to engage each tool.

Figure 12A:
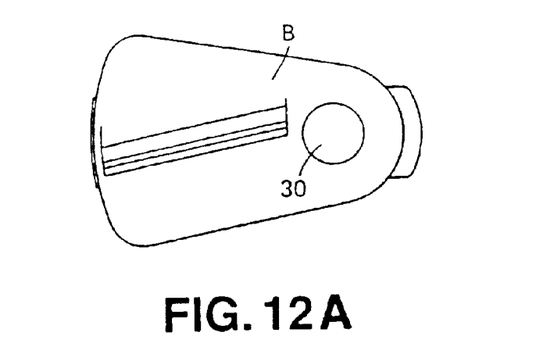
FIGS. 12A to 12C shows in plan view a selection of blades to be fitted to the carrier namely 12A a slicer, 12B another slier, 12C a grater.
Figure 12B:
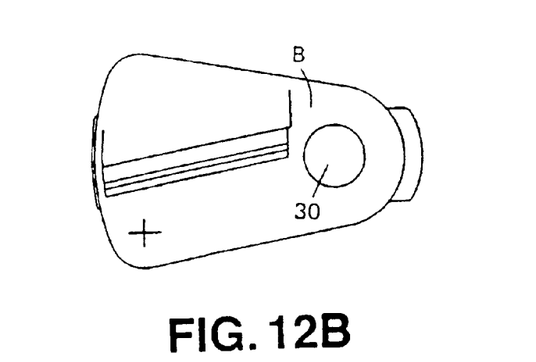
Figure 12C:
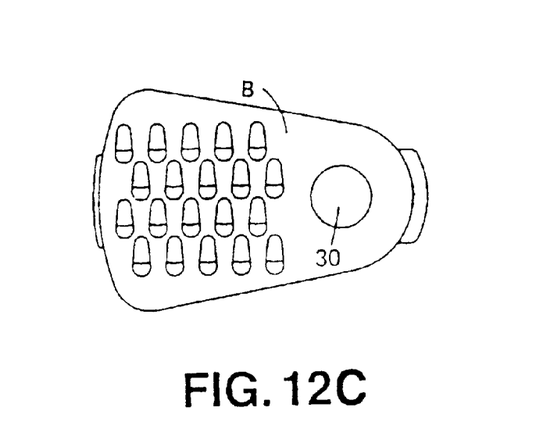
Figure 13A:
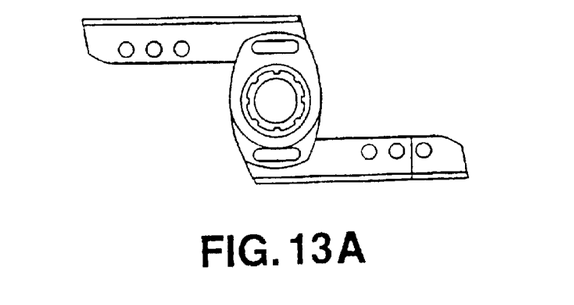
FIGS. 13A and 13B are a plan and elevational views of a chopper for use with the stem of FIG. 9.
Figure 13B:
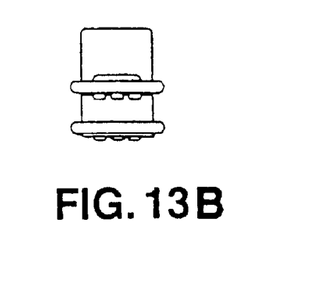
Figure 14A:
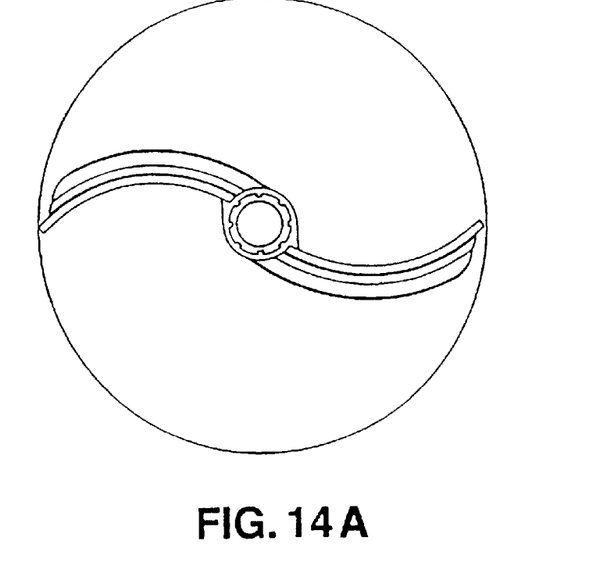
FIGS. 14A and 14B are plan and elevational views of a whisk attachment.
Figure 14B:
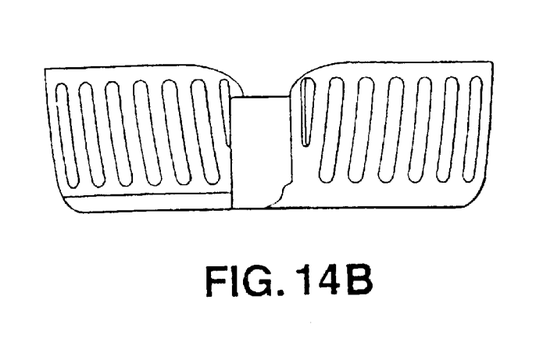
Figure 15A:
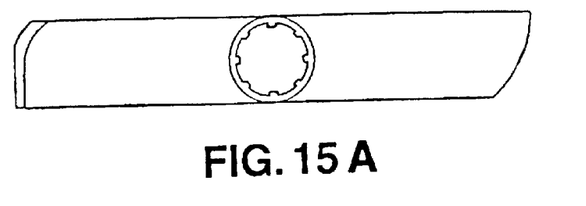
FIGS. 15A and 15B are plan view and side elevational view of an ice cream beater.
Figure 15B:
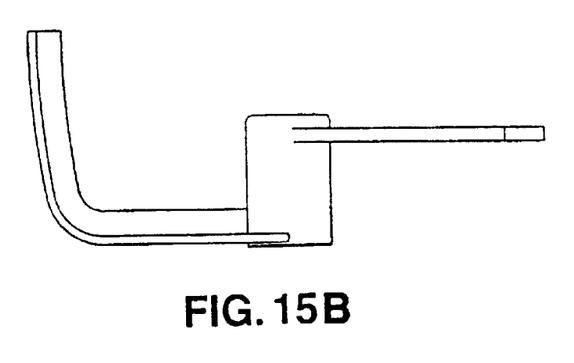

Representative individual blades B are shown in FIGS. 12A, 12B, 12C. Each blade comprises a body of generally ellipsoidal form dimensioned to be snap fitted into the enclosed slot 27 and the hole 25 and has a hole 30 at its narrower end. Any blade B is mounted on the carrier 24 and the stem 21 is then received in the hole 25, and then passed upwardly to receive the polygonal end 10 of the central shaft 8, the lower end of the stem then engaging the boss 20 in the floor of the bowl 1. The handle 4 is rotated, to beat, whisk as appropriate. In such a case the gear train is in the condition shown in FIG. 5.

Figure 16:
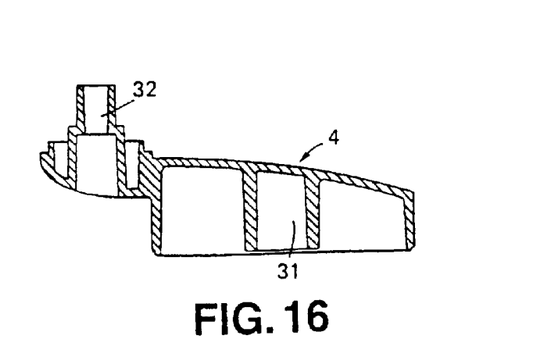
FIG. 16 is a vertical sectional view of the drive handle.

As shown in FIG. 16, the handle 4 is an ellipsoidal body having a lower central hole 31 to receive the upper end of the drive shaft 16 and at one end a shank 32 to receive the knob 5.

Figure 17:
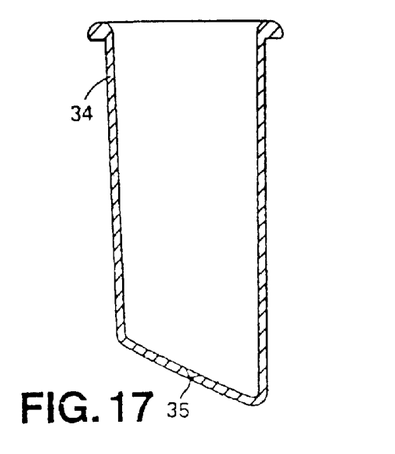
FIG. 17 is a vertical sectional view of the plunger.

A wall 33 (FIG. 1) is present on one side of the lid 3 to define a socket to receive a plunger 34 shown in FIG. 17. The wall is set at an angle to the vertical. The plunger has a small hole 35 at its base. The plunger may be used to force foodstuffs, e.g. vegetables into the processor and the hole 35 may be used to add liquids to the contents, e.g. to dribble oil to a mayonnaise.

The nature of the tool determines whether the gear train will be in the slow speed or high speed condition. For the slicer, chopper or ice cream beater, the low speed use will be appropriate; the whisk will require high speed.

The food processor is simple to operate. The appropriate tool is engaged with the lower end 10 of the shaft 8. Rotation of the handle 4 will cause the tool to rotate at a speed required for its use, depending on the vertical position of the shaft 8. All the tools may be accommodated within the bowl.

The invention is not limited to the embodiment shown.

What is claimed is:

1. A hand operated food processor comprising a container for the food to be processed; a plurality of rotary tools each for processing food; each tool individually releasably engaged with engaging means connected to a gear assembly, the engaging means comprising one end of a first shaft carrying a gear which engages a gear wheel connected to a drive shaft for a rotary handle, by which the processor is hand operated; a third shaft carrying two spaced apart gears of different diameters adjacent the other two, the four gears forming the gear assembly, arranged so that in one condition the first gear engages the drive shaft gear and the gears of the third shaft are idle and the tool connected to the engaging means is rotatable at a relatively slow speed and in a second condition the first shaft gear engages the wider diameter gear on the third shaft and the narrower diameter gear engages the drive shaft gear, whereby the tool connected to the engaging means is rotatable at a relatively faster rate.

2. A food processor according to claim 1, wherein the shaft is normally urged into a seating and is located there in the first condition and in the second condition the tool engaged with the first shaft moves the shaft away from the seating so that the first shaft gear can engage the wider diameter gear.

3. A food processor according to claim 2, wherein a spring biases the shaft downwardly when the tool is in the first condition and is compressed when the tool is in the second condition.

4. A hand operated food processor according to claim 1, including a lid detachably engagable with the bowl, a generally central hole in the lid, the first shaft extending through the hole into the bowl, the shaft being urged downwardly into the bowl by the spring means, the drive shaft being offset from the central shaft, the gears being interengagable to co-operate so that hand rotation of the handle rotates the central shaft, the third rotary shaft being mounted on the lid with the gears being vertically spaced apart, the upper gear being of a greater diameter than the lower.

5. A food processor according to claim 4, wherein the lid comprises a floor and a dome, the centre shaft is generally vertical and the compressible spring is biased between the upper end of the shaft and the overlying ceiling portion of the dome.

6. A food processor according to claim 1, including a set of tools each releasably engagable with the lower end of the shaft and the bowl is dimensioned so that the tools collectively may be stored in the bowl.

7. A food processor according to claim 6, including a blade carrier mountable on the lower end of the central shaft, the blade carrier having an enclosed radial slot to receive a blade tool for rotation in the second condition.

8. A food processor according to claim 7, wherein the tool has side fins and is mountable on the lower end of the shaft which is urged upwardly against the downward bias of the spring to move the gear assembly to the second condition.

9. A food processsor according to claim 8, including a central projection in the base of the bowl to engage the lower end of the stem of the tool mounted thereon and to cause compression of the spring.

10. A food processor according to claim 4, wherein a hole is present in the dome of the lid, to receive a plunger member.

11. A food processor according to claim 10, wherein a small hole is present in the base of the plunger member whereby small doses of liquid may be added to the bowl.

* * * * *